US012703251B2

(12) United States Patent
Oh

(10) Patent No.: US 12,703,251 B2
(45) Date of Patent: Aug. 11, 2026

(54) TORQUE CONTROL SYSTEM AND METHOD FOR DRIVE SYSTEMS OF ELECTRIC VEHICLES

(71) Applicants: HYUNDAI MOTOR COMPANY, Seoul (KR); KIA CORPORATION, Seoul (KR)

(72) Inventor: Jiwon Oh, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 205 days.

(21) Appl. No.: 18/612,860

(22) Filed: Mar. 21, 2024

(65) Prior Publication Data

US 2025/0153580 A1 May 15, 2025

(30) Foreign Application Priority Data

Nov. 14, 2023 (KR) ........................ 10-2023-0156978

(51) Int. Cl.
*G06F 17/00* (2019.01)
*B60L 15/20* (2006.01)

(52) U.S. Cl.
CPC ..... *B60L 15/2054* (2013.01); *B60L 2240/423* (2013.01); *B60L 2240/486* (2013.01)

(58) Field of Classification Search
CPC ........... B60L 15/2054; B60L 2240/423; B60L 2240/486; B60L 2240/421; B60L 15/20;
(Continued)

(56) References Cited

U.S. PATENT DOCUMENTS 12,049,139 B2 * 7/2024 Baek .................. B60L 15/2054
2022/0169123 A1 * 6/2022 Baek ...................... B60L 50/60
(Continued)

FOREIGN PATENT DOCUMENTS

JP 2012001087 A * 1/2012
JP 5387516 B2 * 1/2014
(Continued)

OTHER PUBLICATIONS

Torque Vectoring Algorithm (Year: 2015).*

*Primary Examiner* — Ronnie M Mancho
(74) *Attorney, Agent, or Firm* — Lempia Summerfield Katz LLC

(57) ABSTRACT

A torque control system and method are disclosed for drive systems of electric vehicles including a shift intervention torque implementation method specialized for an electric vehicle being capable of executing both a virtual shift mode and a drift mode. The torque control system includes a controller configured to generate a rear wheel torque command and a front wheel torque command based on vehicle driving information detected by a driving information detector. The controller determines whether or not there is a virtual shift request depending on the vehicle driving state while executing the drift mode. The controller determines rear wheel torque as a value changed from a target torque before shifting to a target torque after shifting during a shift section upon determining that there is the virtual shift request. The controller determines front wheel torque as a shift intervention torque value configured to create a virtual shift feeing.

16 Claims, 7 Drawing Sheets

(58) Field of Classification Search
CPC ............ B60L 2260/20; B60Y 2200/91; B60Y 2300/60
USPC ............................................................ 701/22
See application file for complete search history.

(56) References Cited

U.S. PATENT DOCUMENTS

| | | | | |
|---|---|---|---|---|
| 2023/0249703 | A1 | 8/2023 | Oh | |
| 2025/0153580 | A1* | 5/2025 | Oh | B60L 15/2054 |
| 2025/0196656 | A1* | 6/2025 | Oh | B60L 15/20 |

FOREIGN PATENT DOCUMENTS

| | | | | | |
|---|---|---|---|---|---|
| KR | 20220077261 | A | * | 6/2022 | F16H 61/24 |
| KR | 20230120144 | A | | 8/2023 | |
| KR | 20250094865 | A | * | 6/2025 | B60L 15/2054 |
| KR | 102855177 | B1 | * | 9/2025 | H02P 27/04 |

* cited by examiner

FIG. 6

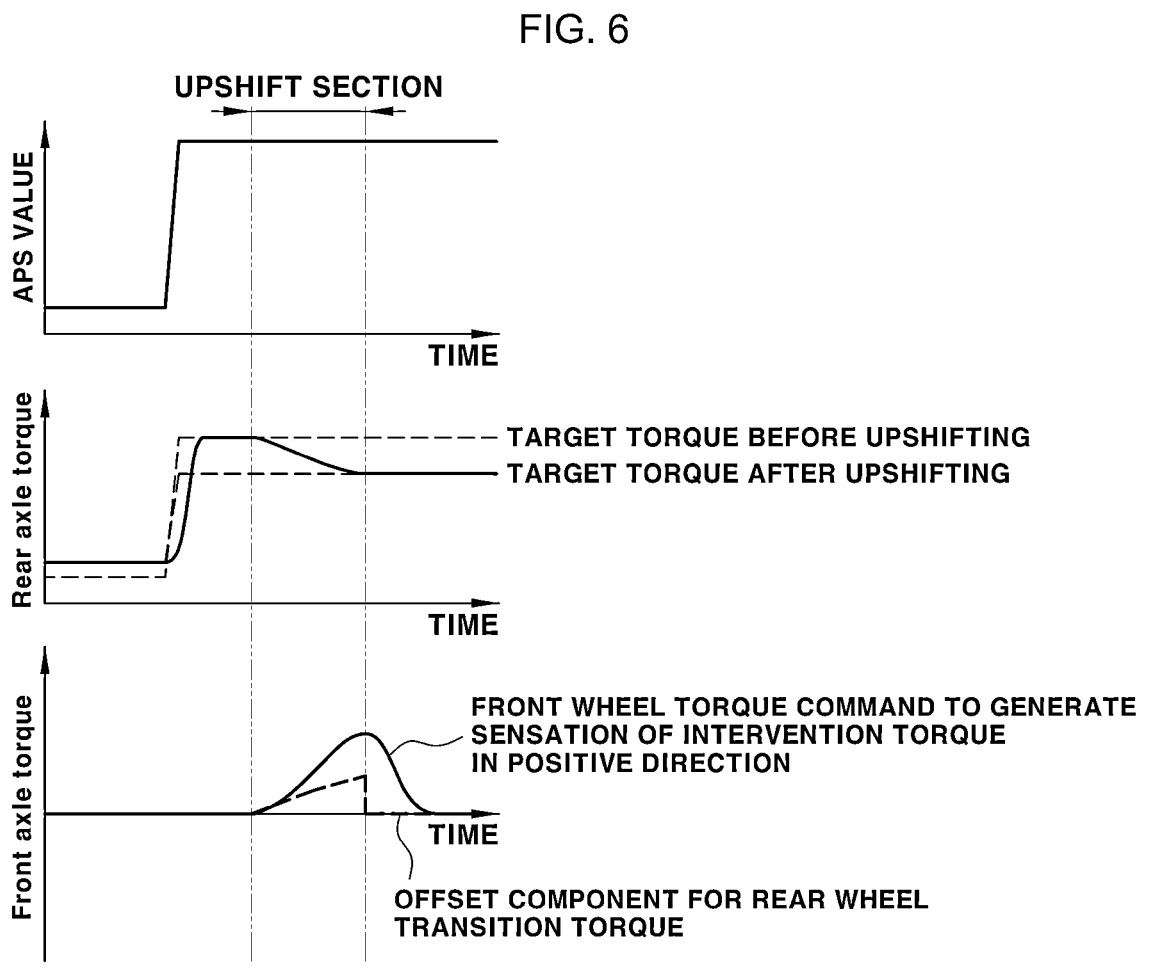

UPSHIFT SECTION
APS VALUE
TIME
Rear axle torque
TARGET TORQUE BEFORE UPSHIFTING
TARGET TORQUE AFTER UPSHIFTING
TIME
Front axle torque
FRONT WHEEL TORQUE COMMAND TO GENERATE SENSATION OF INTERVENTION TORQUE IN POSITIVE DIRECTION
TIME
OFFSET COMPONENT FOR REAR WHEEL TRANSITION TORQUE

TORQUE CONTROL SYSTEM AND METHOD FOR DRIVE SYSTEMS OF ELECTRIC VEHICLES

CROSS-REFERENCE TO RELATED APPLICATION

This application claims under 35 U.S.C. § 119(a) the benefit of priority to Korean Patent Application No. 10-2023-0156978, filed on Nov. 14, 2023, the entire contents of which are incorporated herein by reference.

BACKGROUND

(a) Technical Field

The present disclosure relates to a torque control system and method for drive systems of electric vehicles. The torque control system may implement shift intervention torque specialized for an electric vehicle being capable of executing both a virtual shift mode and a drift mode.

(b) Background Art

Today, the electric vehicle market is gradually expanding. As most issues, such as responsiveness, fuel efficiency, exhaust gas regulation, and other technical problems in internal combustion engines, are solved in electric vehicles, the possibility of developing various new technologies has opened up. Therefore, breaking away from the development paradigm of internal combustion engine vehicles, whether or not unique selling points (USP) are secured through expanded functions, is emerging as the biggest factor in competitiveness of electric vehicles in the electric vehicle market in the future.

Particularly, as a USP to highlight the fun of driving, a virtual shift function providing a virtual shifting effect has become a new development consideration among vehicle manufacturers.

In addition, a drift mode configured to implement functions specialized for the fun of driving, such as drift, using the characteristics of electric vehicles having a high degree of freedom in driving force control is also being developed as one of the unique strengths, i.e., USP, which may appeal in marketing.

The drift mode is known technology in electric vehicles. In the case of an all-wheel drive (AWD) vehicle, this technology includes a strategy to stop intervention in tire slip control and to generate driving force only from a rear wheel motor, both occurring simultaneously to provide an environment facilitating generation of rear wheel slip through a method of connecting electronic limited slip differentials (e-LSDs) to a driver.

Additionally, the virtual shift function is also known technology in electric vehicles. Unlike internal combustion engine vehicles, electric vehicles do not use multistage transmissions. Instead, a reducer using a fixed gear ratio is disposed between a motor and drive wheels.

This is because, unlike an internal combustion engine (ICE), which may have a wide distribution range of energy efficiency depending on an operating point and may provide high torque only in a high-speed range, the motor may have a relatively small difference in efficiency depending on an operating point and may achieve high torque at low speeds just by characteristics of the motor itself.

In addition, a vehicle equipped with an internal combustion engine drive system requires an oscillation mechanism such as a torque converter or a clutch, due to characteristics of an internal combustion engine that is not capable of being driven at low speeds. However, in the drive system of an electric vehicle, a motor is easily driven at low speeds and thus the oscillation mechanism may be omitted.

Further, unlike the torque of the internal combustion engine generated by aerodynamic and thermodynamic reactions, the torque of the electric vehicle is generally precise, smooth, and highly responsive compared to the torque of the internal combustion engine.

Due to these mechanical differences, unlike internal combustion engine vehicles, electric vehicles may provide smooth driving without interruption due to shifting. However, absence of a transmission in an electric vehicle is clearly an advantage in that it provides smooth driving without interruption due to shifting, but for drivers who want the fun of driving, absence of mechanical elements, such as the transmission, and absence of a shift feeling may cause boredom or dissatisfaction.

Accordingly, even electric vehicles without multistage transmissions require technology that allows drivers to feel the same driving sensation, fun, excitement, and sense of direct connection as in vehicles equipped with multistage transmissions.

In particular, when a driver wants to feel a driving sensation, fun, excitement, and a sense of direct connection provided by an engine, a transmission, a clutch, and the like, a function to implement virtual drivability needs to be provided so that the driver may experience desired sensations in the same vehicle without having to replace the vehicle.

Currently known technology for the virtual shift function includes a strategy not to set the torque range of a motor to the entirety of a currently available motor torque range, but to determine a virtual gear position depending on vehicle driving conditions. The strategy also includes varying the torque range depending on the determined virtual gear position and simultaneously calculating a virtual engine speed, i.e., revolutions per minute (RPM), and the range thereof by applying a gear ratio corresponding to the virtual gear position. The strategy also includes achieving and expressing the calculated virtual RPM and the range thereof.

During execution of the drift mode alone, rear wheel slip may occur very easily. However, it may not be easy to control the range of rear wheel slip occurrence as much as the driver wishes. This is because torque responsiveness of the electric vehicle is very fast and a torque generation range is set to the entirety of the available motor torque range due to characteristics of electric vehicles.

The reason why this problem did not occur in internal combustion engine vehicles is that most internal combustion engine vehicles are actually equipped with multistage transmissions. A driver may select a desired torque range and engine RPM range through appropriate shifting during drift driving.

Considering the above background, the shortcomings of the drift mode executed in the conventional electric vehicles may be very easily compensated for through the virtual shift function. However, on the contrary, shift intervention torque used to create and provide a virtual shift feeling in the virtual shift function generates torque unrelated to driver's intention, and may thus deteriorate ease in drift control.

The above information disclosed in this Background section is only to enhance understanding of the background of the disclosure. Therefore, the Background section may contain information that does not form the prior art that is already known to a person of ordinary skill in the art.

SUMMARY

The present disclosure has been made in an effort to solve the above-described problems associated with the prior art. It is an object of the present disclosure to provide a technology to implement shift intervention torque specialized for simultaneous execution of both a virtual shift function and a drift mode.

In one aspect, the present disclosure provides a torque control method for drive systems of electric vehicles. The method includes determining, by a controller, whether or not there is a virtual shift request depending on a vehicle driving state, while executing a drift mode in which an electric vehicle is driven in a drift state by generating torque required to drive the electric vehicle only by a rear wheel motor and inducing rear wheel slip. The torque control method also includes determining, by the controller, rear wheel torque as a value changed from a target torque before shifting to a target torque after shifting, during a shift section. The torque control method also includes determining front wheel torque as a shift intervention torque value configured to create a virtual shift feeing upon determining that there is the virtual shift request. The torque control method also includes generating, by the controller, a rear wheel torque command and a front wheel torque command using the determined rear wheel torque and front wheel torque as respective command values. The torque control method also includes controlling a rear wheel motor depending on the generated rear wheel torque command and controlling a front wheel motor depending on the generated front wheel torque command.

In another aspect, the present disclosure provides a torque control system for drive systems of electric vehicles. The system includes a driving information detector configured to detect information for indicating a vehicle driving state. The torque control system also includes a controller configured to generate a rear wheel torque command and a front wheel torque command for satisfying requested torque based on vehicle driving information including the information detected by the driving information detector. The torque control system also includes a rear wheel motor and a front wheel motor controlled depending on the rear wheel torque command and the front wheel torque command generated by the controller. The controller determines whether or not there is a virtual shift request depending on the vehicle driving state, while executing a drift mode in which an electric vehicle is driven in a drift state by generating torque required to drive the electric vehicle only by the rear wheel motor and inducing rear wheel slip. The controller also determines rear wheel torque as a value changed from a target torque before shifting to a target torque after shifting during a shift section upon determining that there is the virtual shift request. The controller also determines front wheel torque as a shift intervention torque value configured to create a virtual shift feeing. The controller also generates the rear wheel torque command and the front wheel torque command using the determined rear wheel torque and front wheel torque as respective command values.

In an embodiment, during the shift section, the rear wheel torque may be determined as a value changed with a predetermined slope.

In another embodiment, during the shift section, the shift intervention torque value may be determined as a value obtained by subtracting the changed rear wheel torque from the target torque before shifting.

In another embodiment, during the shift section, the shift intervention torque value may be determined as a value obtained by multiplying a value, obtained by subtracting the changed rear wheel torque from the target torque before shifting, by a scaling factor, or may be determined as a value obtained by applying a filter or a slope limit to the value, obtained by subtracting the changed rear wheel torque from the target torque before shifting.

In another embodiment, during the shift section, the controller may determine shift intervention torque having a value corresponding to real-time virtual shift progress using set data configured to define a correlation between the virtual shift progress and the shift intervention torque.

In another embodiment, during the shift section, the controller may determine the virtual shift progress using Equation E1 from a first speed configured to be a virtual engine speed before shifting, a second speed configured to be a virtual engine speed in a target gear position, and a current virtual engine speed configured to be a real-time virtual engine speed during changing from the first speed to the second speed.

$$\text{Virtual Shift Progress (\%)}=\{(\text{Current Virtual Engine Speed}-\text{First Speed})/(\text{Second Speed}-\text{First Speed})\}\times 10 \quad \text{[E1]}$$

In another embodiment, the controller may determine the virtual engine speed as a value proportional to a value obtained by multiplying a vehicle drive system speed by a virtual gear ratio in a current virtual gear position, or as a value proportional to a value obtained by multiplying a vehicle speed by the virtual gear ratio in the current virtual gear position.

In another embodiment, the controller, upon determining that there is a virtual shift request in a non-drift mode configured such that the drift mode is not executed, during the shift section, may determine a final rear wheel torque command as a correction value obtained by correcting the rear wheel torque command with shift intervention torque configured to create the virtual shift feeling, and may control the rear wheel motor depending on the determined final rear wheel torque command.

Other aspects and embodiments of the disclosure are discussed below.

The above and other features of the disclosure are also discussed below.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus are not limitative of the present disclosure, and wherein:

FIGS. 5-7 are graphs illustrating torque control states during virtual shifting in the drift mode according to the present disclosure.

Figure 1:
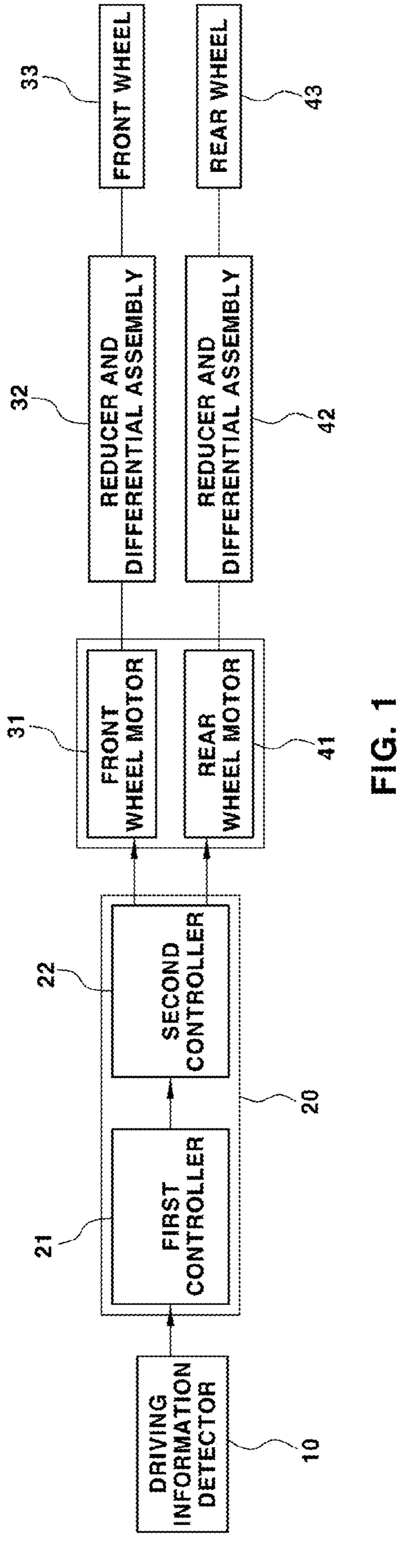
FIG. 1 is a block diagram showing the configuration of a system for executing a torque control process for drive systems according to the present disclosure.

It should be understood that the appended drawings are not necessarily drawn to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawings.

DETAILED DESCRIPTION

Hereinafter, reference is made in detail to various embodiments of the present disclosure, examples of which are illustrated in the accompanying drawings and described below. Specific structural or functional descriptions in embodiments of the present disclosure set forth in the description which follows are given to describe embodiments of the present disclosure. The embodiments of the present disclosure may be embodied in many alternative forms. Further, it should be understood that the present disclosure should not be construed as being limited to embodiments set forth herein. Embodiments of the present disclosure are provided only to completely disclose the technical concepts of the disclosure and cover modifications, equivalents, or alternatives which come within the scope and technical range of the disclosure.

In the following description of embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," and the like.

Wherever possible, the same reference numbers are used throughout the drawings to refer to the same or like parts. The terminology used herein is for the purpose of describing particular embodiments only and is not intended to be limiting. As used herein, singular forms may be intended to include plural forms as well, unless the context clearly indicates otherwise. The terms "comprises," "comprising," "including," and "having" and variations thereof are inclusive and therefore specify the presence of stated features, integers, operations, operations, elements, components, and/or combinations thereof. Such terms do not preclude the presence or addition of one or more other features, integers, operations, operations, elements, components, and/or combinations thereof. When a controller, component, device, element, or the like of the present disclosure is described as having a purpose or performing an operation, function, or the like, the controller, component, device, or element should be considered herein as being "configured to" meet that purpose or to perform that operation or function.

The known virtual shift function applied to electric vehicles is performed with the main goal of providing a driver in an electric vehicle with the same shift feeling as that of an internal combustion engine vehicle actually equipped with a multistage transmission while driving.

Because a multistage transmission is not mounted in the electric vehicle, the shift feeling provided by the electric vehicle to the driver through the virtual shift function, so that the driver may actually experience the shift feeling, is a virtual shift feeling that mimics the shift feeling provided by the internal combustion engine vehicle.

The virtual shift function of the electric vehicle changes the longitudinal acceleration of the vehicle using torque volatility of a motor and associates the change in the longitudinal acceleration of the vehicle with a shift event. This allows the driver of the electric vehicle to feel as if he or she is driving a vehicle equipped with a virtual shift.

However, when the drift mode is executed, this goal should be changed. When the drift mode is executed, the priority is not to provide the shift feeling, but to improve the ease of drift control by providing a torque adjustment range desired by the driver.

This may be achieved by differentiating the torque range for each gear position, which is one of the characteristics of the virtual shift function. However, shift intervention torque generated when shifting, which is another characteristic of the virtual shift function, is different from torque requested by the driver, and may thus deteriorate or reduce ease of drift control.

The background to this disadvantage is that, when the drift mode is executed, a strategy to generate all torque from a rear wheel axle to facilitate occurrence of oversteer is used.

That is to say, considering characteristics of the drift mode, when lateral force occurs simultaneously with occurrence of rear wheel slip, a difference in lateral forces provided by front and rear wheels occurs. The difference in lateral forces provided by the front and rear wheels generates a yaw moment of the vehicle and induces oversteer when shift intervention torque, which is not intended by the driver, acts on the rear wheels and changes a rear wheel slip amount. Such a change may also affect the yaw moment, and may thus deteriorate or reduce ease of drift control.

Therefore, so as to suit the prioritized purpose, the virtual shift function in a non-drift mode may be performed to create a virtual shift feeling by reflecting the shift intervention torque in the motor torque. The virtual shift function in the drift mode may be performed so that shift intervention torque control to generate the virtual shift feeling is performed based on the front wheels so as not to deteriorate or lessen ease of drift control.

FIG. 1 is a block diagram showing the configuration of a system for executing a torque control process for drive systems according to the present disclosure. The configuration of the shown system is described as below.

The present disclosure may be applied to a vehicle in which front wheels 33 and rear wheels 43 are driven by independent drive devices, respectively. The present disclosure may be applied to a vehicle equipped with a front wheel drive device configured to apply torque to the front wheels 33 and a rear wheel drive device configured to apply torque to the rear wheels 43. The front wheels 33 and the rear wheels 43 are driving wheels respectively connected to the drive devices so that power may be transmitted to the front wheels 33 and the rear wheels 43 from the respective drive devices.

Further, the present disclosure may be applied to a vehicle in which both a front wheel drive device and a rear wheel drive device are motors. In the following description, a motor 31 corresponding to the front drive device is referred to as "a front wheel motor", and a motor 41 corresponding to the rear drive device is referred to as "a rear wheel motor".

As shown in this figure, the front wheel motor 31 is connected to the front wheels 33 through a reducer and differential assembly 32 so as to transmit power to the front wheels 33. The rear wheel motor 41 is connected to the rear wheels 43 through a reducer and differential assembly 43 so as to transmit power to the rear wheels 43.

Further, in the following description, a front wheel torque command and a rear wheel torque command refer to a front axle torque command and a rear axle torque command and indicate torque commands for the respective motors 31 and 41 configured to drive the vehicle. In other words, a front wheel motor torque command, which is a torque command for the front wheel motor 31, and a rear wheel motor torque command, which is a torque command for the rear wheel motor 41, and among motor torques, torque in a vehicle acceleration direction and torque in a motor driving direction are torques in a positive (+) direction, i.e., torques having positive (+) values.

Further, braking torque includes regenerative braking torque generated by the front wheel motor 31 and the rear wheel motor 41 and frictional braking torque generated by a frictional braking device (not shown). The regenerative braking torque and the frictional braking torque are torques in a deceleration direction and are thus torques in a negative (−) direction, i.e., torques having negative (−) values.

When the front wheel torque command and the rear wheel torque command, which are torque commands for the motors 31 and 41, exhibit negative (−) torque values, these torque commands are regenerative braking torque commands for the corresponding motors 31 and 41. Also, front wheel motor torque and rear wheel motor torque having the negative (−) values are torques in the deceleration direction and a regeneration direction.

Further, when the front wheel torque command and the rear wheel torque command exhibit positive (+) torque values, these torque commands are drive torque commands for the corresponding motors 31 and 41. Also, front wheel motor torque and rear wheel motor torque having the positive (+) values are torques in the acceleration direction and the motor driving direction.

In the present disclosure, the drive system of the vehicle includes a front wheel side drive system and a rear wheel side drive system. Each of the front wheel side drive system and the rear wheel side drive system includes drive elements, such as a motor, driving wheels, a drive shaft between the motor and driving wheels, a reducer and differential assembly, an axle, and the like.

In other words, the front wheel side drive system includes the front wheel motor 31, the front wheels 33, a drive shaft (not shown) between the front wheel motor 31 and the front wheels 33, the reducer and the differential assembly 32, and an axle (not shown). The rear wheel side drive system includes the rear wheel motor 41, the rear wheels 43, a drive shaft (not shown) between the rear wheel motor 41 and the rear wheels 43, the reducer and the differential assembly 42, and an axle (not shown).

Accordingly, torques output by the front wheel motor 31 and the rear wheel motor 41 in the respective drive systems may be transmitted to the front wheels 33 and the rear wheels 43 through the drive elements, such as the drive shafts, the reducer and differential assemblies 32 and 42, the axles, and the like.

Further, although not shown in FIG. 1, a battery is connected to the front wheel motor 31 and the rear wheel motor 41 via inverters so as to be rechargeable. The inverters may include a front wheel inverter (not shown) configured to drive and control the front wheel motor 31, and a rear wheel inverter (not shown) configured to drive and control the rear wheel motor 41.

In the electric vehicle, operation (driving and regeneration) of the front wheel motor 31 and the rear wheel motor 41 is controlled depending on torque commands generated by a controller 20. The controller 20 determines requested torque based on vehicle driving information acquired by a driving information detector 10, determines front wheel torque and rear wheel torque distributed from the requested torque, and generates and outputs respective motor torque commands, i.e., a front wheel torque command and a rear wheel torque command, using the front wheel torque and the rear wheel torque as command values.

Further, a controller 20 controls operation of the front wheel motor 31 and the rear wheel motor 41 through the inverters based on the front wheel torque command and the rear wheel torque command. As described above, when command torques based on the front wheel torque command and the rear wheel torque command are torques in the positive (+) direction (torques having positive values), the front wheel torque command and the rear wheel torque command may be defined as drive torque commands, i.e., torque commands in the acceleration direction and the motor driving direction. Also, when the command torques based on the front wheel torque command and the rear wheel torque command are torques in the negative (−) direction (torques having negative values), the front wheel torque command and the rear wheel torque command may be defined as regenerative braking torque commands, i.e., torque commands in the deceleration direction and the regeneration direction.

The controller 20 in the present disclosure may include a first controller 21, which determines requested torque required to drive the vehicle based on the vehicle driving information, such as a driving input value input by a driver, or receives the requested torque from other controllers, such as an Advanced Driver Assistance System (ADAS) controller. The first controller 21 may also generate and output the front wheel torque command and the rear wheel torque command which are torque commands for the respective motors (or the respective axles) based on the requested torque. The controller 20 in the present disclosure may also include a second controller 22, which controls operation of the front wheel motor 31 and the rear wheel motor 41 depending on the front and rear wheel torque commands output by the first controller 21.

The first controller 21 may be a Vehicle Control Unit (VCU) which determines and generates torque commands which are necessary for vehicle driving in a general vehicle. A method of determining requested torque required to drive a vehicle from vehicle driving information and determining torque commands to control torques of drive systems including motors and a process thereof are known in the art, and a detailed description thereof has been omitted.

When the first controller 21 outputs the front wheel torque command and the rear wheel torque command, the second controller 21 receives the front and rear wheel torque commands and controls operation of the front wheel motor 31 and the rear wheel motor 41 through the front wheel inverter and the rear wheel inverter.

Thereby, torque output by the front wheel motor 31 is applied to the front wheels 33 through the reducer and differential assembly 32 of the front wheel side drive system. Also, torque output by the rear wheel motor 41 is applied to the rear wheels 43 through the reducer and differential assembly 42 of the rear wheel side drive system.

The second controller 22 may be a general Motor Control Unit (MCU) which controls operation of a drive motor through an inverter depending on a torque command output by a Vehicle Control Unit in an electric vehicle.

In the present disclosure, the vehicle driving information, such as the driving input value input by the driver to the controller 20, is information indicating a vehicle driving state, and may include sensor detection information detected by the driving information detector 10 and input to the controller 20 through a vehicle network.

The driving information detector 10 may include an accelerator position sensor (an APS, not shown) which detects an accelerator pedal input value (APS value, %) input by the driver, sensors (not shown) which detect speeds of the drive systems, and a sensor (not shown) which detects a vehicle speed.

The speeds of the drive systems may be rotational speeds of the front wheel motor 31 and the rear wheel motor 41 or rotational speeds of the driving wheels 33 and 43 (wheel speeds). The sensors that detect the speeds of the front wheel side drive system and the rear wheel side drive system may be sensors which detect rotational speeds of the respective motors 31 and 41. The sensors may be general resolvers configured to detect positions of rotors of the motors 31 and 41. Otherwise, the sensors that detect the speeds of the front wheel side drive system and the rear wheel side drive system may be general wheel speed sensors configured to detect rotational speeds of the driving wheels 33 and 43 (i.e., the wheel speeds).

Further, the sensor that detects the vehicle speed may also be a wheel speed sensor. Acquisition of vehicle speed information from a signal from the wheel speed sensor is well known in the art, and a detailed description thereof has been omitted.

As the vehicle driving information used to determine and generate the requested torque and the torque commands by the controller 20, the accelerator pedal input value (the APS value, %) input by the driver, the rotational speeds of the motors 31 and 41, the rotational speeds of the driving wheels 33 and 43, and the vehicle speed, which are detected by the driving information detector 10, may be selectively used.

Further, the vehicle driving information may include information determined by the controller 20 by itself in a broad sense. The vehicle driving information may further include information (for example, requested torque information) input to the controller 20 from other controllers (for example, the ADAS controller) in the vehicle through the vehicle network.

Although a control subject is divided into the first controller 21 and the second controller 22 in the above description, the torque control process according to the present disclosure may be performed by one integrated control element rather than a plurality of controllers.

A plurality of controllers and one integrated control element may be commonly called the controller 20, and the torque control process according to the present disclosure, which is described below, may be executed by the controller 20. In the following description, the first controller 21 and the second controller 22 are commonly called the controller 20.

In the present disclosure, during operating after entering the drift mode, the rear wheel motor 41 generates differentiated motor torque to satisfy requested torque for each virtual gear position in execution of the virtual shift function, and the front wheel motor 31 generates shift intervention torque to create and implement a virtual shift feeling.

Accordingly, a driving system torque control strategy may be used in which the driver may use a differentiated torque range for each virtual gear position through the virtual shift function so as to secure ease in drift driving, and simultaneously, may shift intervention torque applied to create the virtual shift feeling does not influence adjustment and control of a rear wheel slip amount.

Further, in the present disclosure, shift intervention torque of a different type from the type of the shift intervention torque generated during virtual shifting in the non-drift mode may be generated for the purpose of specialization for the drift mode.

In the present disclosure, the non-drift mode is a mode in which the drift mode is not executed, i.e., drift control is not performed, and may be a mode other than the drift mode.

The virtual shift function in the drift mode should be performed when tire force reaches a limit and is thus difficult to perform under conditions suitable for creating a shift feeling. The virtual shift function should not interfere with a driver's intention for drift driving for the purpose of the drift mode.

At the same time, further improved ease in drift driving should be able to be provided to the driver through differentiation of a torque range for each virtual gear position compared to a case in which drift driving is performed when the virtual sift function is not used.

Therefore, regardless of whether or not upshift, downshift, power-on, or power-off is carried out, a torque command in which a torque range adjustment effect due only to shifting is reflected during shifting may be generated for the rear wheels 43. Also, a torque component generated in a type of offsetting a torque change to reflect the torque range adjustment effect due to shifting in the rear wheels 43 may be generated as a shift intervention torque component and may be used in the front wheels 31.

A torque value configured to offset the torque change on the rear wheels 43, i.e., an offset for the torque change on the rear wheels 43, serves as shift intervention torque, and the shift intervention torque is determined as front wheel torque.

However, the offset for the torque change on the rear wheels 43 may be multiplied by a scaling factor, or a filter or a slope limit may be applied to the offset, so as not to completely offset the torque change but to partially bring out the shift feeling.

During a shift section in which a target torque before shifting transitions to a target torque after shifting, rear wheel torque may be determined as having a torque value that linearly changes (increases or decreases) with a predetermined slope from the target torque before shifting to the target torque after shifting. The offset may be a value obtained by subtracting the linearly changing rear wheel torque from the target torque before shifting.

Alternatively, the shift intervention torque may be determined by a map using a virtual shift progress (%) as an input and may be used as a front torque command.

For this purpose, set data defining a correlation between the virtual shift progress and the shift intervention torque may be input and stored in advance in the controller 20. The map in which the shift intervention torque is set to a value corresponding to the virtual shift progress may be used as the set data.

The virtual shift progress (%) refers to a transition completion rate calculated until a virtual engine speed calculated based on a gear position before shifting (a current virtual gear position) completely transitions to a virtual engine speed calculated based on a gear position after shifting (a target virtual gear position), when virtual shifting is performed.

More specifically, the virtual shift progress may be determined from a virtual engine speed. When there is a shift request, in the case in which a first speed which is a virtual engine speed before shifting should be changed to a second speed which is a virtual engine speed in a target gear position, the virtual shift progress may be determined by Equation 1 below using a current virtual engine speed which is a real-time virtual engine speed during the shift section together with the first speed and the second speed.

Virtual Shift Progress (%)={(Current Virtual Engine Speed−First Speed)/(Second Speed−First Speed)}×100 [Equation 1]

The virtual shift progress may be 0% at the point in time when shifting begins, and the virtual shift progress may be 100% at the point in time when shifting has been completed. When a shift event is canceled during shifting or another shifting should be carried out, a newly calculated virtual shift progress obtained by updating the gear position before shifting and the gear position after shifting is used.

Since the virtual engine speed in the present disclosure is similar to a virtual engine speed determined, displayed and used in a general virtual shift system applied to electric vehicles, a detailed description of a method of determining the virtual engine speed has been omitted in the present disclosure.

The virtual engine speed is known as a key variable required to create and provide virtual effects, such as a virtual shift feeling, virtual sound, virtual vibration, and the like, in a general virtual shift system or virtual sound system configured to virtually implement and provide characteristics of internal combustion engine vehicles in electric vehicles. Further, the virtual engine speed is used as one of main display information displayed on a cluster in electric vehicles.

In the present disclosure, the controller 20 determines shift intervention torque dedicated to the drift mode from the set data, such as the map using the above-described virtual shift progress (%) as an input, reflects the determined shift intervention torque only in front wheel motor torque, generates a front wheel torque command using the front wheel motor torque, in which the shift intervention torque is reflected, as a command value, and outputs the front wheel torque command.

Operation of the front wheel motor 31 may thereby be controlled by the front wheel torque command in which the shift intervention torque is reflected. Ultimately, the shift intervention torque may be generated only from the front wheel motor 31.

Figure 2:
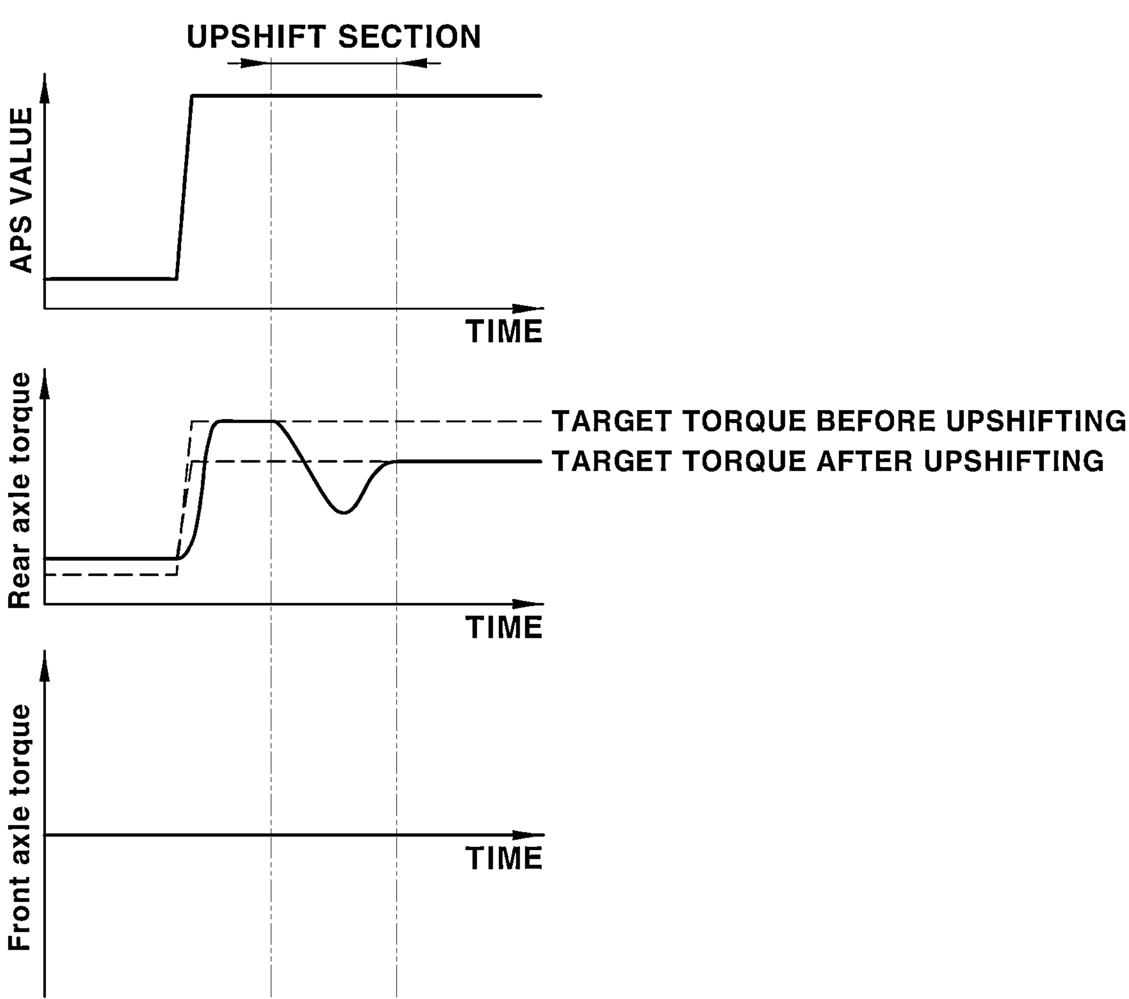
FIGS. 2-4 are graphs illustrating torque control states during virtual shifting in a non-drift mode in which a drift mode according to the present disclosure is not executed.
Figure 3:
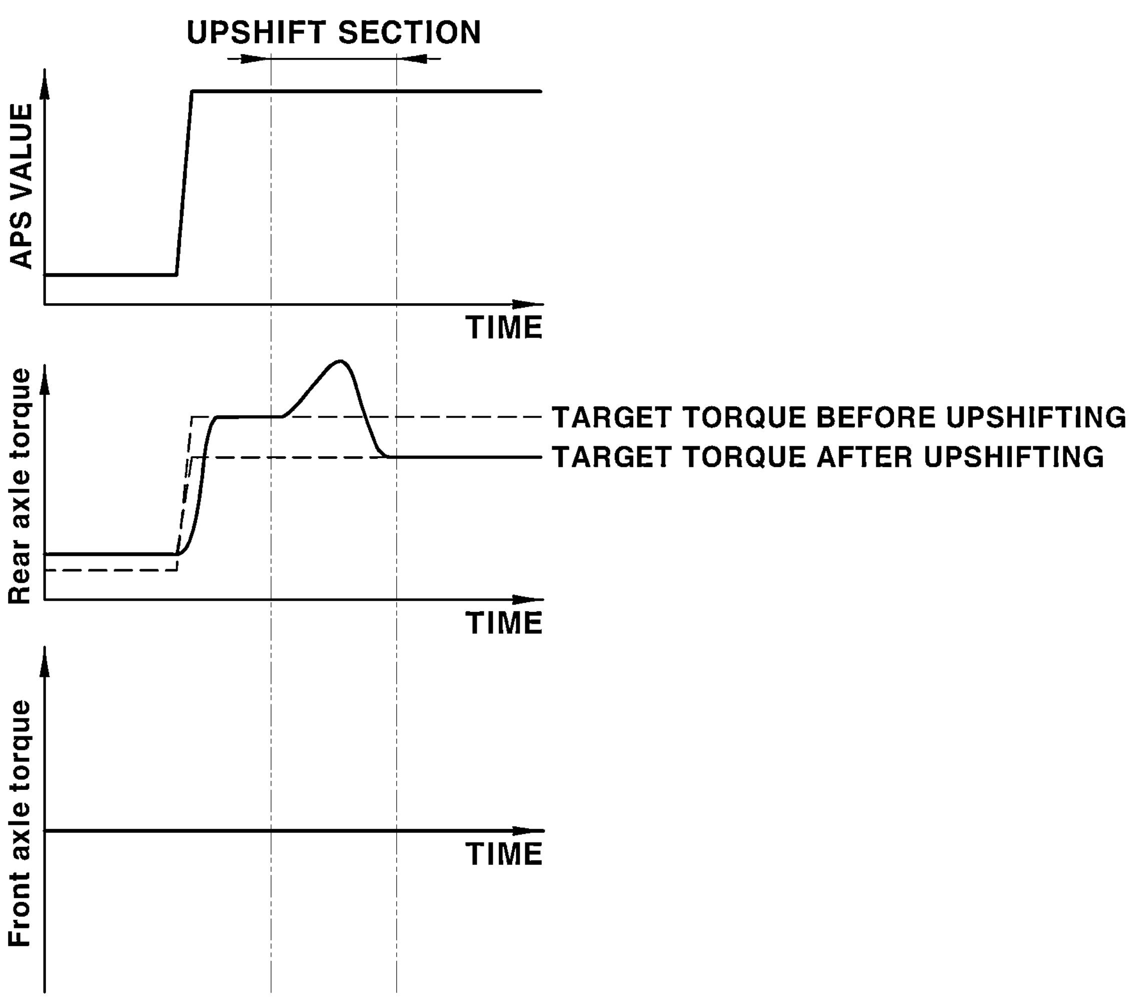
Figure 4:
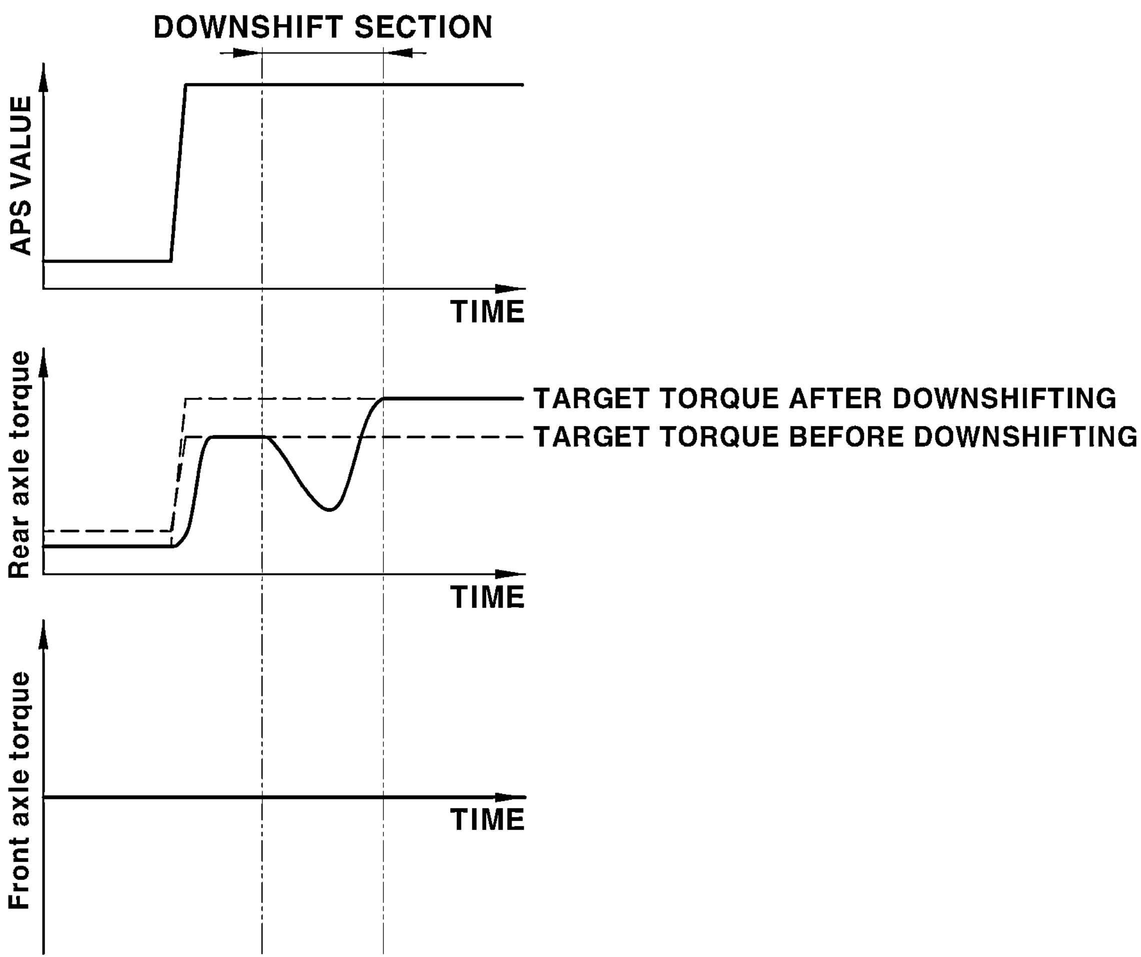

FIGS. 2-4 are graphs illustrating torque control states during virtual shifting in the non-drift mode in which the drift mode according to the present disclosure is not executed. In each figure, an "APS value" refers to a driver's accelerator pedal input value (%) detected by an accelerator pedal sensor of the driving information detector 10.

Further, in each figure, "rear axle torque" refers to rear wheel torque applied to the rear wheels 43 by the rear wheel motor 41 of the rear wheel side drive system. In addition, "front axle torque" refers to front wheel torque applied to the front wheels 33 by the front wheel motor 31 of the front wheel side drive system.

As shown in FIGS. 2-4, during the virtual shift section in the non-drift mode, torque may be generated only by the rear wheel motor, and torque may not be generated by the front wheel motor.

In the non-drift mode, torque required for driving is generated only by the rear wheel motor 41 (i.e., only the rear wheels are used as driving wheels). A rear wheel torque command using torque obtained by reflecting shift intervention torque in rear wheel torque as a command value is generated and output. The torque output of the rear wheel motor is controlled by the rear wheel torque command generated by correcting the rear wheel torque with the shift intervention torque.

A method, such as that disclosed in Korean Patent Laid-open Publication No. 10-2023-0120114 (Aug. 17, 2023) filed by the applicants may be referred to as a control method executed to create a virtual shift feeling in the non-drift mode.

In detail, a torque control process executed by the controller 20 may include collecting real-time vehicle driving information during driving of the vehicle. The torque control process may also include determining virtual variable information including a virtual gear position based on the collected real-time vehicle driving information. The torque control process may also include determining a torque range corresponding to a current virtual gear position among the determined virtual variable information. The torque control process may also include determining driver's requested torque corresponding to a driving input value input by a driver among the real-time vehicle driving information within the determined torque range. The torque control process may also include determining shift intervention torque to create the virtual shift feeling based on the determined virtual variable information upon determining that there is a change in the virtual gear position. The torque control process may also include determining and generating a final torque command based on the determined driver's requested torque and the determined shift intervention torque. The torque control process may also include controlling operation of a motor to drive the vehicle depending on the final torque command.

As in examples shown in FIGS. 2-4, the vehicle may be driven by generating torque only through the rear wheel motor 41 of the vehicle. For this purpose, the final torque command may be used as a rear wheel torque command. That is to say, the final torque command in which the shift intervention torque is reflected may be used as a torque command for the rear wheel motor, and torque required to drive the vehicle may be output only by the rear wheel motor by controlling operation of the rear wheel motor using the rear wheel torque command.

The virtual variable information may further include a virtual engine speed determined from a vehicle drive system speed and a vehicle speed among the real-time vehicle driving information. The virtual engine speed may be determined as a value proportional to a value obtained by multiplying the vehicle drive system speed by a virtual gear ratio corresponding to the current virtual gear position, or as a value obtained by multiplying the vehicle speed by the virtual gear ratio corresponding to the current virtual gear position.

Further, a torque range for each of a plurality of virtual gear positions is set in the controller 20. The torque range for each of the plurality of virtual gear positions may be set such that a torque range for a virtual gear position having a lower gear ratio is wider.

In addition, in the controller 20, a torque range width, which is a difference between upper and lower limits of the torque range for each gear position, may be set in conjunction with a predetermined virtual gear ratio value of the corresponding virtual gear position. The upper and lower limits of the torque range for each gear position may be set to values proportional to the determined virtual gear ratio value of the corresponding virtual gear position.

Further, the torque range of each virtual gear position may include a positive (+) torque area. The driver's requested torque may be determined as a value corresponding to an accelerator pedal input value between the lower limit and the upper limit of the torque range.

Otherwise, the torque range of each virtual gear position may include a negative (−) torque area and a positive (+) torque area. The driver's requested torque may be determined as a value corresponding to an accelerator pedal input value between the lower limit and the upper limit of the torque range.

Further, upon determining that there is a change in the virtual gear position determined in determining the virtual variable information, the controller 20 uses the virtual gear position before the change as the current gear position, in determining the torque range.

In addition, in determining the final torque command based on the determined driver's requested torque and the shift intervention torque, the controller 20 may determine the final torque command by summing the driver's requested torque and the shift intervention torque and may determine a rear wheel torque command as the determined final torque command. Thereafter, the controller 20 may control operation of the rear wheel motor 41 depending on the rear wheel torque command.

In a virtual shift system, the shift intervention torque is used as a kind of correction torque which corrects motor torque so as to create and provide a virtual shift feeling. When requested torque and motor torque required to drive the vehicle are determined, the controller 20 determines final motor torque by correcting the determined motor torque with the shift intervention torque. The final motor torque may be determined by summing the motor torque and the shift intervention torque.

In the present disclosure, the controller 20 may generate and output a rear wheel torque command using the determined final motor torque as a command value and may control operation of the rear wheel motor 41 through the rear wheel torque command.

FIG. 2 illustrates an example in which shift intervention torque is determined as torque in the negative (−) direction and applied during virtual upshifting in the non-drift mode.

FIG. 3 illustrates an example in which shift intervention torque is determined as torque in the positive (+) direction and applied during virtual upshifting in the non-drift mode. When the torque in the positive (+) direction is used as the shift intervention torque during virtual upshifting, a virtual shift feeling in the form of a push sensation may be implemented and provided.

FIG. 4 illustrates an example in which shift intervention torque is applied during virtual downshifting in the non-drift mode.

As shown in these figures, in the non-drift mode, the shift intervention torque used to create, implement, and provide a virtual shift feeling may be reflected in rear wheel side torque. The shift intervention torque is applied to the rear wheel motor 41.

In other words, as shown in these figures, during an upshift or downshift section in which the rear wheel torque transitions from a target torque before shifting to a target torque after shifting, the controller 20 may determine the rear wheel torque as a value in which the shift intervention torque is reflected. The controller may also generate and output a rear wheel torque command using the value in which the shift intervention torque is reflected as a command value.

Figure 5:
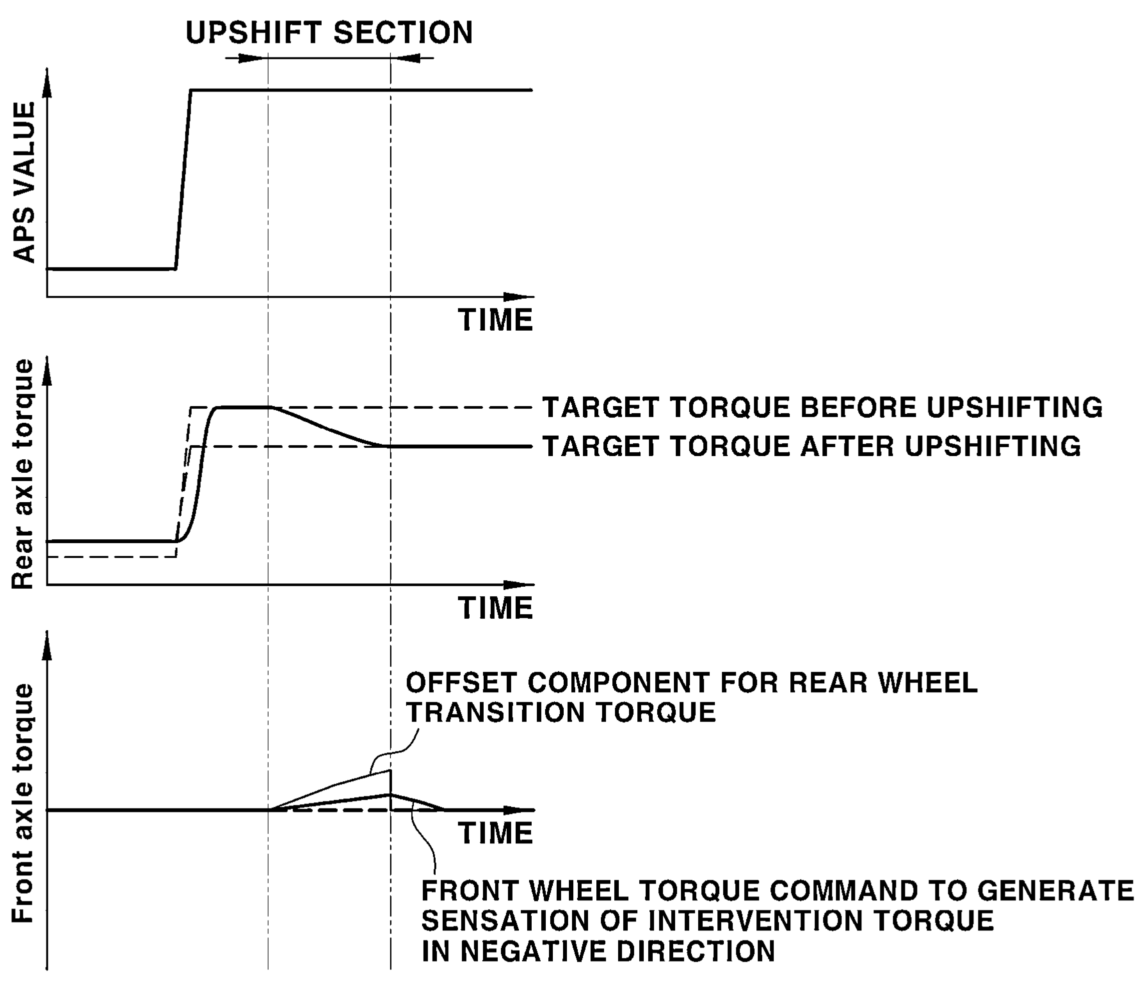
Figure 7:
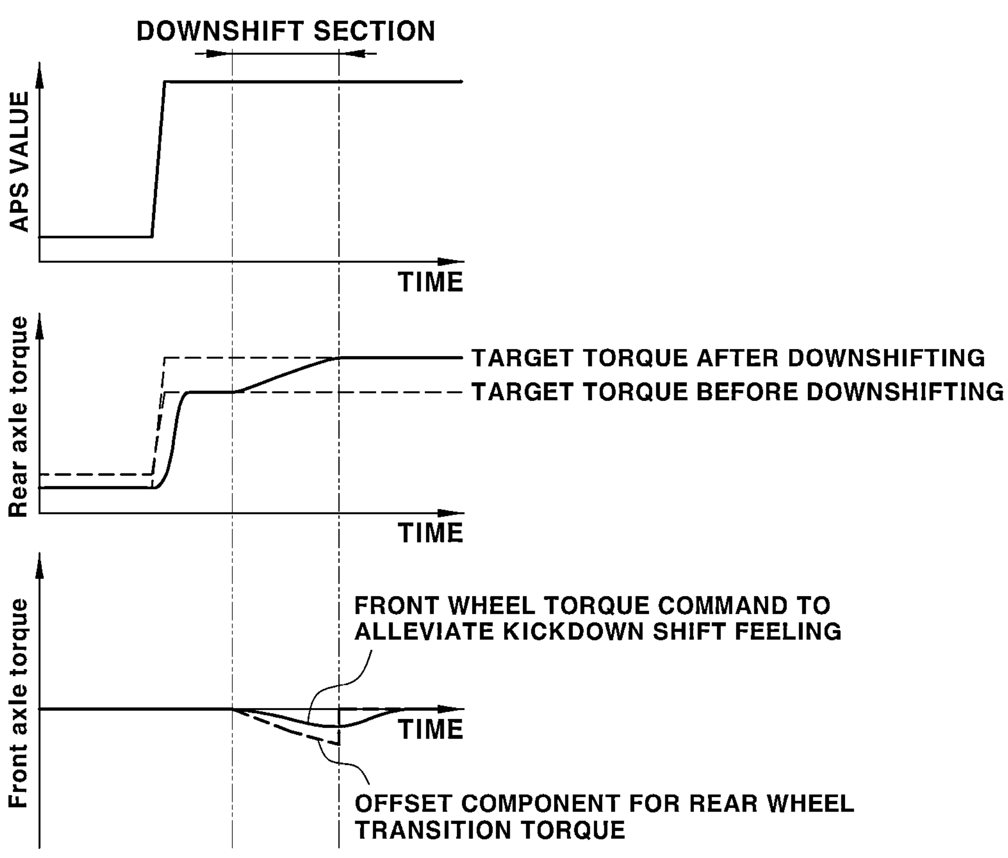

FIGS. 5-7 are graphs illustrating torque control states during virtual shifting in the drift mode according to the present disclosure.

While drift driving, during a shift section in which a target torque before shifting transitions to a target torque after shifting, the controller 20 may determine rear wheel torque as having a torque value that linearly changes (increases or decreases) with a predetermined slope from the target torque before shifting to the target torque after shifting.

Further, in the case of the front wheels 33, a torque component having a value to offset a change in torque to reflect the torque range adjustment effect due to shifting based on the target torque before shifting on the rear wheels 43 may be set to be generated as a shift intervention torque component and be used on the front wheels 31.

An offset amount may be a value obtained by subtracting rear wheel torque during the virtual shift section, i.e., real-time rear wheel torque determined as a value changed during the upshift or downshift section, from the target torque before shifting.

However, the offset amount for the change in the torque on the rear wheels 43 may be multiplied by a scaling factor, or a filter or a slope limit is applied to the offset amount, so as not to completely offset the torque change but to partially bring out the shift feeling.

Alternatively, the shift intervention torque may be determined by a map using a virtual shift progress (%) as an input and may be set to a front torque command.

FIG. 5 illustrates an example in which shift intervention torque is determined as torque in the negative (−) direction and applied during virtual upshifting in the drift mode.

FIG. 6 illustrates an example in which shift intervention torque is determined as torque in the positive (+) direction and applied during virtual upshifting in the drift mode. When the torque in the positive (+) direction is used as the shift intervention torque during virtual upshifting, a virtual shift feeling in the form of a push sensation may be implemented and provided.

FIG. 7 illustrates an example in which shift intervention torque is applied during virtual downshifting in the drift mode.

As shown in these figures, in the drift mode, the shift intervention torque used to create, implement and provide a virtual shift feeling may be reflected in front wheel side torque. The shift intervention torque is applied to the front wheel motor 31.

As shown in these figures, during the upshift or downshift section in which front and rear wheel torques transition from target torques before shifting (upshifting or downshifting) to target torques after shifting, the controller 20 may determine the shift intervention torque as front wheel motor torque (with reference to "front axle torque"). The controller 20 also generates and outputs a front wheel torque command using the shift intervention torque as a command value so as to control the front wheel motor 31 to output the shift intervention torque.

When the front wheel torque and the rear wheel torque are determined as described above, the controller 20 generates a rear wheel torque command and a front wheel torque command using the front wheel torque and the rear wheel torque as command values. The controller 20 simultaneously controls operation of the rear wheel motor 41 depending on the rear wheel torque command and operation of the front wheel motor 31 depending on the front wheel torque command.

Thereby, the rear wheel motor 41 generates and outputs the determined rear wheel torque as drive torque to drive the vehicle, and the front wheel motor 31 generates and outputs the determined front wheel torque as shift intervention torque to create and implement a virtual shift feeling.

In this way, the torque control method for drive systems according to the present disclosure may effectively prevent deterioration of ease in oversteer adjustment due to shift intervention torque in the drift mode.

Further, according to the present disclosure, a driver's shift intention may be reflected and a virtual shift feeling may be created and implemented through the shift intervention torque in the drift mode. Also, marketability and unique selling points (USPs) of an electric vehicle to which the drift mode is applied may be enhanced by enabling self-oriented reflection of the driver's shift intention in the drift mode.

The disclosure has been described in detail with reference to embodiments thereof. However, it should be appreciated by those of ordinary skill in the art that changes may be made in these embodiments without departing from the principles and spirit of the disclosure, the scope of which is defined in the appended claims and their equivalents.

What is claimed is:

1. A torque control method for a drive systems of an electric vehicles, the torque control method comprising:

determining, by a controller, whether or not there is a virtual shift request depending on a vehicle driving state while executing a drift mode in which an electric vehicle is driven in a drift state by generating torque required to drive the electric vehicle only by a rear wheel motor and inducing rear wheel slip;

determining, by the controller, during gear shifting, rear wheel torque as a value changed from a target torque before the gear shifting to a target torque after the gear shifting, and determining front wheel torque as a shift intervention torque value configured to create a virtual shift feeling upon determining that there is the virtual shift request;

generating, by the controller, a rear wheel torque command and a front wheel torque command, as respective command values, using the determined rear wheel torque and the determined front wheel torque;

controlling, by the controller, a rear wheel motor depending on the generated rear wheel torque command; and controlling, by the controller, a front wheel motor depending on the generated front wheel torque command.

2. The torque control method of claim 1, wherein, during the gear shifting, the rear wheel torque is determined as a value changed with a predetermined slope from the target torque before the gear shifting to the target torque after the gear shifting.

3. The torque control method of claim 1, wherein, during the gear shifting, the shift intervention torque value is determined as a value obtained by subtracting the changed rear wheel torque from the target torque before shifting.

4. The torque control method of claim 1, wherein, during the gear shifting, the shift intervention torque value is determined as:

a value obtained by multiplying a value, obtained by subtracting the changed rear wheel torque from the target torque before shifting, by a scaling factor; or a value obtained by applying a filter or a slope limit to the value, obtained by subtracting the changed rear wheel torque from the target torque before shifting.

5. The torque control method of claim 1, wherein, during the gear shifting, the controller determines shift intervention torque having a value corresponding to real-time virtual shift progress using set data configured to define a correlation between the virtual shift progress and the shift intervention torque.

6. The torque control method of claim 5, wherein, during the gear shifting, the controller determines:

the virtual shift progress using the following equation E1 from a first speed configured to be a virtual engine speed before shifting Virtual Shift Progress (%)={(Current Virtual Engine Speed−First Speed)/(Second Speed−First Speed)}×100;

a second speed configured to be a virtual engine speed in a target gear position; and a current virtual engine speed configured to be a real-time virtual engine speed during changing from the first speed to the second speed.

7. The torque control method of claim 6, wherein the controller determines the virtual engine speed as:

a value proportional to a value obtained by multiplying a vehicle drive system speed by a virtual gear ratio in a current virtual gear position; or a value proportional to a value obtained by multiplying a vehicle speed by the virtual gear ratio in the current virtual gear position.

8. The torque control method of claim 1, wherein, upon determining that there is a virtual shift request in a non-drift mode configured such that the drift mode is not executed, during the gear shifting, the controller:

determines a final rear wheel torque command as a correction value obtained by correcting the rear wheel torque command with shift intervention torque configured to create the virtual shift feeling; and controls the rear wheel motor depending on the determined final rear wheel torque command.

9. A torque control system for a drive system of an electric vehicle, the torque control system comprising:

a driving information detector configured to detect information configured to indicate a vehicle driving state;

a controller configured to generate a rear wheel torque command and a front wheel torque command configured to satisfy requested torque based on vehicle driving information including the information detected by the driving information detector; and a rear wheel motor and a front wheel motor controlled depending on the rear wheel torque command and the front wheel torque command generated by the controller, wherein the controller is configured to determine whether or not there is a virtual shift request depending on the vehicle driving state while executing a drift mode in which an electric vehicle is driven in a drift state by generating torque required to drive the electric vehicle only by the rear wheel motor and inducing rear wheel slip, determine rear wheel torque as a value changed, during gear shifting, from a target torque before the gear shifting to a target torque after the gear shifting, upon determining that there is the virtual shift request, determine front wheel torque as a shift intervention torque value configured to create a virtual shift feeling, and generate the rear wheel torque command and the front wheel torque command, as respecting command values, using the determined rear wheel torque and front wheel torque.

10. The torque control system of claim 9, wherein, during the gear shifting, the controller is configured to determines the rear wheel torque as a value changed with a predetermined slope from the target torque before the gear shifting to the target torque after the gear shifting.

11. The torque control system of claim 9, wherein, during the gear shifting, the controller is configured to determines the shift intervention torque value as a value obtained by subtracting the changed rear wheel torque from the target torque before shifting.

12. The torque control system of claim 9, wherein, during the gear shifting, the controller is configured to determines the shift intervention torque value as:

a value obtained by multiplying a value, obtained by subtracting the changed rear wheel torque from the target torque before shifting, by a scaling factor; or a value obtained by applying a filter or a slope limit to the value, obtained by subtracting the changed rear wheel torque from the target torque before shifting.

13. The torque control system of claim 9, wherein, during the gear shifting, the controller is configured to determine shift intervention torque having a value corresponding to real-time virtual shift progress using set data configured to define a correlation between the virtual shift progress and the shift intervention torque.

14. The torque control system of claim 13, wherein, during the gear shifting, the controller is configured to determine:

the virtual shift progress using the following equation E1 from a first speed configured to be a virtual engine speed before shifting Virtual Shift Progress (%)={(Current Virtual Engine Speed−First Speed)/(Second Speed−First Speed)}×100;

a second speed configured to be a virtual engine speed in a target gear position; and a current virtual engine speed configured to be a real-time virtual engine speed during changing from the first speed to the second speed.

15. The torque control system of claim 14, wherein the controller is configured to determine the virtual engine speed as:

a value proportional to a value obtained by multiplying a vehicle drive system speed by a virtual gear ratio in a current virtual gear position; or a value proportional to a value obtained by multiplying a vehicle speed by the virtual gear ratio in the current virtual gear position.

16. The torque control system of claim 9, wherein, upon determining that there is a virtual shift request in a non-drift mode configured such that the drift mode is not executed, during the gear shifting, the controller is configured to:

determine a final rear wheel torque command as a correction value obtained by correcting the rear wheel torque command with shift intervention torque configured to create the virtual shift feeling; and control the rear wheel motor depending on the determined final rear wheel torque command.

* * * * *